United States Patent
Eguchi

(10) Patent No.: US 8,482,790 B2
(45) Date of Patent: Jul. 9, 2013

(54) IMAGE FORMING APPARATUS AND IMAGE PROCESSING METHOD

(75) Inventor: Kimimori Eguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 378 days.

(21) Appl. No.: 12/933,991

(22) PCT Filed: Jun. 9, 2010

(86) PCT No.: PCT/JP2010/060152
§ 371 (c)(1),
(2), (4) Date: Sep. 22, 2010

(87) PCT Pub. No.: WO2010/147126
PCT Pub. Date: Dec. 23, 2010

(65) Prior Publication Data
US 2011/0128556 A1   Jun. 2, 2011

(30) Foreign Application Priority Data
Jun. 19, 2009   (JP) .................................. 2009-146928

(51) Int. Cl.
*G06F 15/00* (2006.01)
(52) U.S. Cl.
USPC ....................................................... 358/1.2
(58) Field of Classification Search
USPC ....................................................... 358/1.2
See application file for complete search history.

(56) References Cited

U.S. PATENT DOCUMENTS 6,366,361 B1 *  4/2002   Dermer et al. ................. 358/1.9
2008/0055654 A1    3/2008   Tamura

FOREIGN PATENT DOCUMENTS

| JP | 2005-143045 A | 6/2005 |
| JP | 2006-129007 A | 5/2006 |
| JP | 2008-61136 A | 3/2008 |
| JP | 4143519 B2 | 6/2008 |

OTHER PUBLICATIONS

International Search Report and Written Opinion in PCT/JP2010/060152, Aug. 4, 2010.
PCT Notification Concerning Transmittal of International Preliminary Report on Patentability, International Preliminary Report on Patentability and Written Opinion, issued Dec. 20, 2011.

* cited by examiner

*Primary Examiner* — Saeid Ebrahimi Dehkordy
(74) *Attorney, Agent, or Firm* — Fitzpatrick, Cella, Harper & Scinto

(57) ABSTRACT

When both of a trapping and a resolution converting process are executed, a deterioration in picture quality occurs. In order to solve this problem, an image forming apparatus is provided which performs a trapping process to expand outlines of objects whose boundaries are in contact with each other, performs a resolution conversion process to change density of edges of an image, and restricts processing so that the trapping process and the resolution conversion process are not executed to a same pixel.

26 Claims, 10 Drawing Sheets

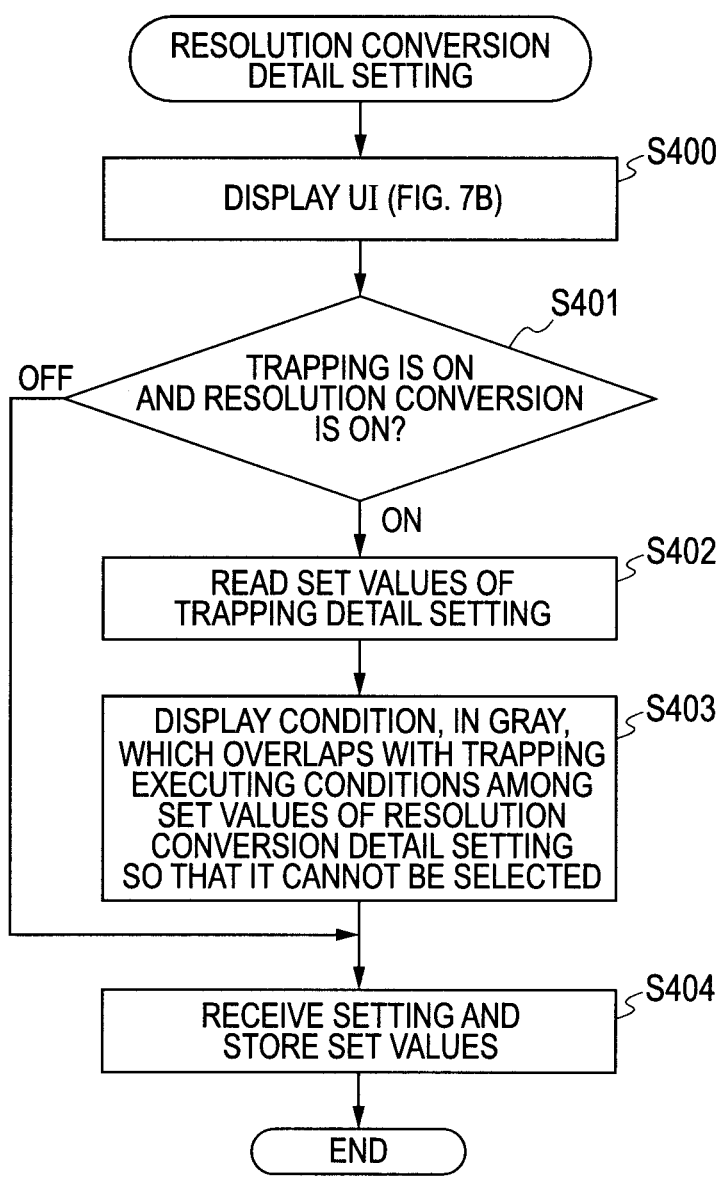

FIG. 6A

```
PRINTER SPECIFICATION SETTING
 TRAPPING
```

601 — · TRAPPING        ON    OFF

602 — · TRAPPING WIDTH  0  1  2  30   pixels

603 — · TRAPPING DENSITY
         0  10  20  30  40  50  60  70  80  90  100  %

604 — · DETAIL SETTING  ▶

```
TRAPPING
 DETAIL SETTING
```

TRAPPING ATTRIBUTE

611 — · TARGET PIXEL       TEXT   GRAPHIC   IMAGE
612 — · REFERENCE PIXEL    TEXT   GRAPHIC   IMAGE

TRAPPING APPLYING DENSITY

613 — · TARGET PIXEL     0  10  20  30  40  50  60  70  80  90  100
614 — · REFERENCE PIXEL  0  10  20  30  40  50  60  70  80  90  100

610

IMAGE FORMING APPARATUS AND IMAGE PROCESSING METHOD

TECHNICAL FIELD

The invention relates to an image forming apparatus and an image processing method.

BACKGROUND ART

Among image forming apparatuses of an electrophotographic type, there is an apparatus having a function for executing a trapping process for slightly overlaying boundaries of objects such as images, figures, characters, or the like of different colors or a resolution converting process for converting input resolution into resolution adapted to enable an image process. The trapping process is a process for preventing a blank (called a "white gap") of a boundary between the image objects which are formed by the different colors and is a process for expanding an outline of one of the objects whose boundaries are in contact with each other toward the other object by a predetermined amount. Thus, an overlap of the objects occurs and "white gap" that is caused by a misregistration or the like can be prevented. The trapping process is not unconditionally executed but, generally, whether or not the process is executed is determined according to density of the objects whose boundaries are in contact with each other. This is because when the density of at least one of the objects whose boundaries are in contact with each other is thin, even if there is "white gap", it is inconspicuous and when the density of both of the objects is thick, "white gap" is conspicuous. Besides them, a technique for designating the trapping on a page unit basis and a technique for changing applying conditions according to attributes of the objects have been proposed.

The resolution converting process is such a process that in the case where resolution of an image which is input by the user to the image forming apparatus of the electrophotographic type differs from resolution which can be processed by each image process such as color process, filter process, or the like, such resolution is converted into resolution which can be processed.

In the resolution converting process, a converting method is changed according to an attribute or density of an image serving as a target. For example, in Japanese Patent No. 04143519, with respect to an image of a character attribute, in the case where it is intended to convert the image of 1200 dpi into 600 dpi, a result obtained by weight-averaging the density of four peripheral pixels of a target pixel is converted into one pixel. Or, with respect to an image of a graphic attribute, by selecting one pixel of the maximum density among the four peripheral pixels, the image is converted into 600 dpi, or the like. The density of edges of such an image becomes uneven due to a weighting method or a phase. However, by executing such a resolution conversion, a data amount of the image after the resolution conversion can be reduced. Therefore, a load of each image process (color process, process for a character) which is executed after completion of the resolution conversion can be reduced. There has also been known a fact that when the resolution converting method is adaptively switched based on such an attribute, each image process is executed to the resolution converted image, after that, the resolution of the image is returned to the input resolution according to a certain rule, and the resultant image is output, the quality of the image is good.

Although the trapping process and the resolution converting process are executed in order to improve picture quality as mentioned above, if both of them are used, various troubles occur. For example, when the resolution converting process, particularly, the resolution conversion is executed by the weight or average, the density of the edges becomes uneven. After that, when the trapping process is executed, a mode to perform the trapping to the image of certain density or more is set. Thus, although the image inherently has the same density, by the resolution conversion which was performed before, the density conversion is executed to a portion whose edge density is equal to or less than the density adapted to perform the trapping and to a portion whose density is equal to or larger than the density adapted to perform the trapping, so that the trapping process is performed in places. Consequently, not only there is no effect of the trapping but also the portions where the density of the edges becomes uneven by executing the resolution converting process typically become conspicuous.

That is, in the regions where both of the processes such as trapping and resolution converting process have been performed, there is a case where the trapping is performed in places and the image deterioration is remarkable.

DISCLOSURE OF THE INVENTION

The invention is made in consideration of the above background art and it is an object of the invention to provide an image forming apparatus and an image processing method which prevent the occurrence of deterioration in picture quality in the case of performing a trapping process and a resolution converting process.

In order to achieve the object, the present invention performs a trapping process to expand outlines of objects whose boundaries are in contact with each other, performs a resolution conversion process to change density of edges of an image, and restricts processing so that the trapping process and the resolution conversion process are not executed to a same pixel.

BRIEF DESCRIPTION OF THE DRAWINGS

FIG. 4 is flowchart of a setting receiving process for realizing exclusive control of the trapping and the resolution conversion in the first embodiment.

FIGS. 6A and 6B are diagrams illustrating UIs of the trapping.

BEST MODE FOR CARRYING OUT THE INVENTION

First Embodiment

Figure 1:
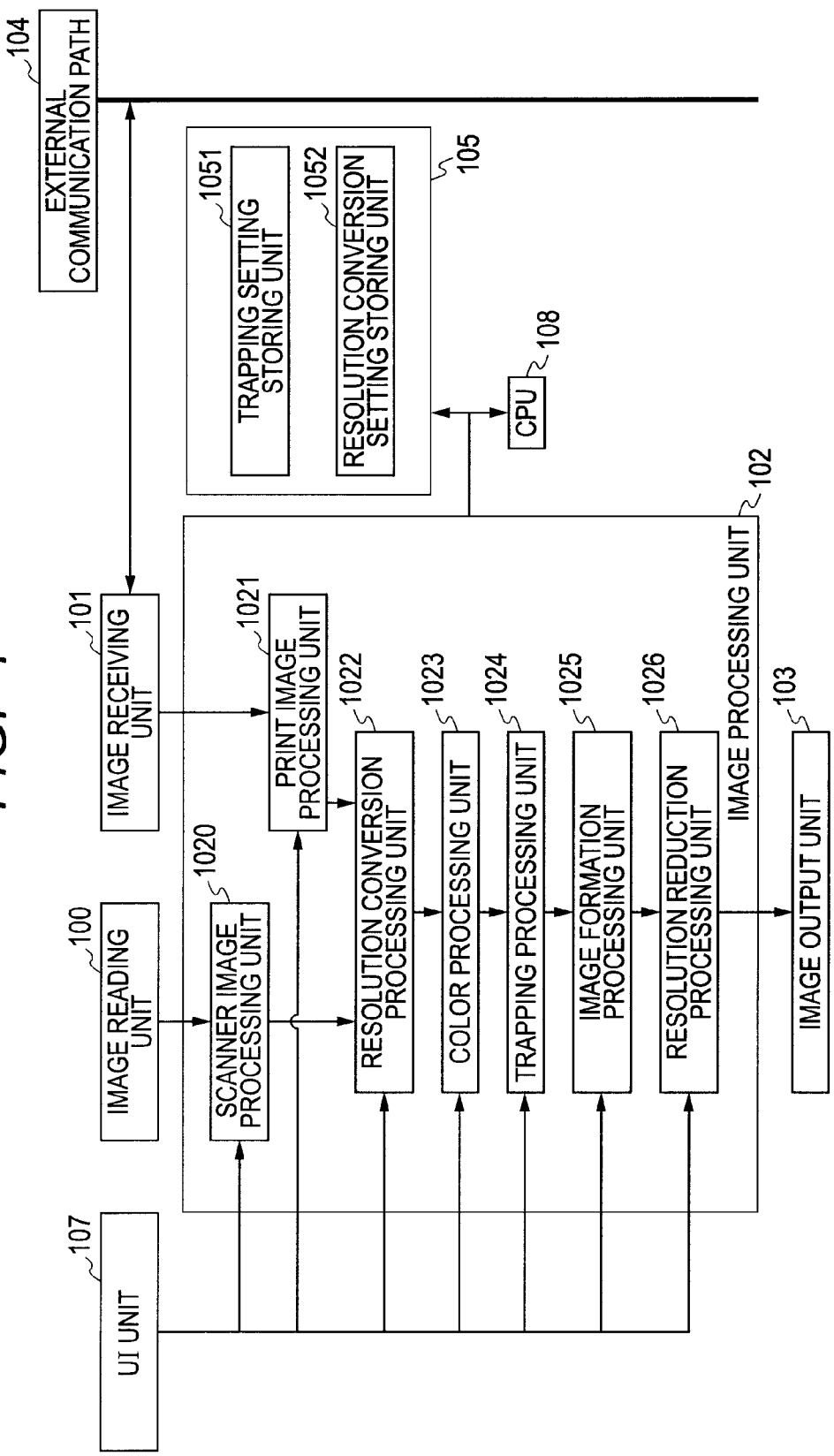
FIG. 1 is schematic block diagram of an image forming apparatus according to an embodiment of the invention.

Details of an image process in an image forming apparatus according to an embodiment of the invention will be described hereinbelow with reference to the drawings. FIG. 1 is a schematic block diagram of the image forming apparatus according to the first embodiment of the invention. Although a digital multifunction apparatus or the like is presumed as an image forming apparatus in the embodiment hereinbelow, not only a copying apparatus but also other printing devices such as a color printer and the like can be also used. First, a structure of the image forming apparatus according to the embodiment will be described. As illustrated in FIG. 1, an image forming apparatus 800 has an image reading unit 100, an image receiving unit 101, a UI unit 107, an image processing unit 102 for executing various kinds of image processes, a storing unit 105, a CPU 106, and an image output unit 103. The image forming apparatus 800 can be also connected to a server for managing image data, a personal computer (PC) for instructing the image forming apparatus to execute a printing, or the like through a network such as LAN, Internet, or the like. The image forming apparatus 800 can be also connected to an external communication path 104 through the image receiving unit 101. The image processing unit 102 can be also constructed as an independent image processing apparatus having only its function by using a computer or the like.

Subsequently, the operation of each construction of the image forming apparatus illustrated in FIG. 1 will be described. The image reading unit 100 has an image scanner or the like and reads an image from an original such as paper or the like. For example, the image reading unit 100 reads a color image of RGB or the like. The read RGB data is sent to the image processing unit 102. A scanner image processing unit 1020 executes image processes such as shading correction, image area separating process, color conversion, and the like to, for example, the RGB color image data read out by the image reading unit 100. By the image area separating process, a natural image attribute, a character image attribute, and the like, which will be described hereinafter, are obtained and an attribute map in which the attributes of each pixel have been stored as a bitmap is formed.

The image receiving unit 101 receives image data (PDL image data) described by a page description language (PDL) through, for example, a communication line or the like. The PDL image data is a set of commands describing objects constructing the image. The image forming apparatus 800 can receive image data expressed by a command group which has been made to correspond to the objects constructing the image without limiting to the PDL image data and can form an image. A case where the PDL image data has been received will be described as an example hereinbelow. The PDL image data which was input to the image receiving unit 101 is sent to a printer image processing unit 1021. First, an interpreter provided in the printer image processing unit 1021 interprets the command group of the PDL image data and outputs an intermediate code (what is called a display list). Subsequently, an RIP (raster image processor) of the printer image processing unit 1021 develops a bitmap image from the intermediate code. The bitmap image data which is formed here has a gradation before quantization and is called a continuous gradation image or contone image. On the other hand, attribute information (graphic attribute, image attribute, color attribute, natural image attribute, character attribute, thin line attribute, and the like) of each pixel from the attribute information included in the command group. That is, the attribute information indicates a kind of object and an attribute map showing the object kind which was made to correspond to the bitmap image data and to which the relevant pixel belongs every pixel is formed.

A resolution conversion processing unit 1022 will be described in detail hereinafter. A color processing unit 1023 receives the data from the image reading unit 100 or the image receiving unit 101 and executes a color converting process of, for example, RGB→CMYK or the like. That is, the RGB colorimetric system data which was input is converted into CMYK colorimetric system data from which the image forming apparatus 800, which will be described hereinafter, forms an image. Further, a trapping processing unit 1024 executes a trapping to the CMYK image data and, thereafter, an image formation processing unit 1025 executes a dither process. Finally, the image data is returned to a desired resolution by a resolution reduction processing unit 1026. According to the trapping or dither, a pixel belonging to the object serving as a processing target is specified with reference to the attribute map and a process switching is performed to the specified pixel in consideration of the attributes in the attribute map. The trapping process is a process for preventing a blank (called "white gap") of a boundary between image objects which are formed by different colors and is a process for expanding an outline of one of the objects whose boundaries are in contact with each other toward the other object by a predetermined amount. Thus, an overlap of the objects whose boundaries are in contact with each other occurs and "white gap" due to a misregistration or the like can be prevented. The trapping process is not unconditionally executed but, generally, for example, whether or not the trapping process is executed is discriminated according to density of the objects whose boundaries are in contact with each other.

Subsequently, constructions and operations of the storing unit 105, CPU 106, and image output unit 103 in the image forming apparatus illustrated in FIG. 1 will be described. The storing unit 105 is constructed by various kinds of storage media such as random access memory (RAM) and read only memory (ROM). For example, the RAM is used as an area for storing data and various kinds of information or is used as a work area of the CPU 106. Further, there is also a case where the storing unit 105 has a non-volatile rewritable memory. For example, a trapping setting storing unit 1051 for storing the trapping setting, a resolution conversion setting storing unit 1052 for storing the resolution conversion setting, and the like are included in such a memory. Conditions adapted to execute the trapping process to a target pixel and the like are included in the trapping setting. Conditions adapted to execute the resolution converting process to the target pixel and the like are included in the resolution conversion setting. Those areas may be included in the trapping processing unit and the resolution converting processing unit. The ROM is used as an area for storing various kinds of control programs. The CPU 106 is used to discriminate and control various kinds of processes according to the programs stored in the ROM. The image output unit 103 has a function for outputting an image (for example, an image is formed onto a recording medium such as print paper and output). An image modification processing method to the bitmap image data obtained after the RIP process has been mentioned above. The invention of the embodiment can be also applied to the case where the processes such as trapping and the like are executed to the data of the object in the RIP. In the case where the processes are executed to the data of the object in the RIP, the processes such as trapping and the like are executed in the print image processing unit 1021.

Figure 8:
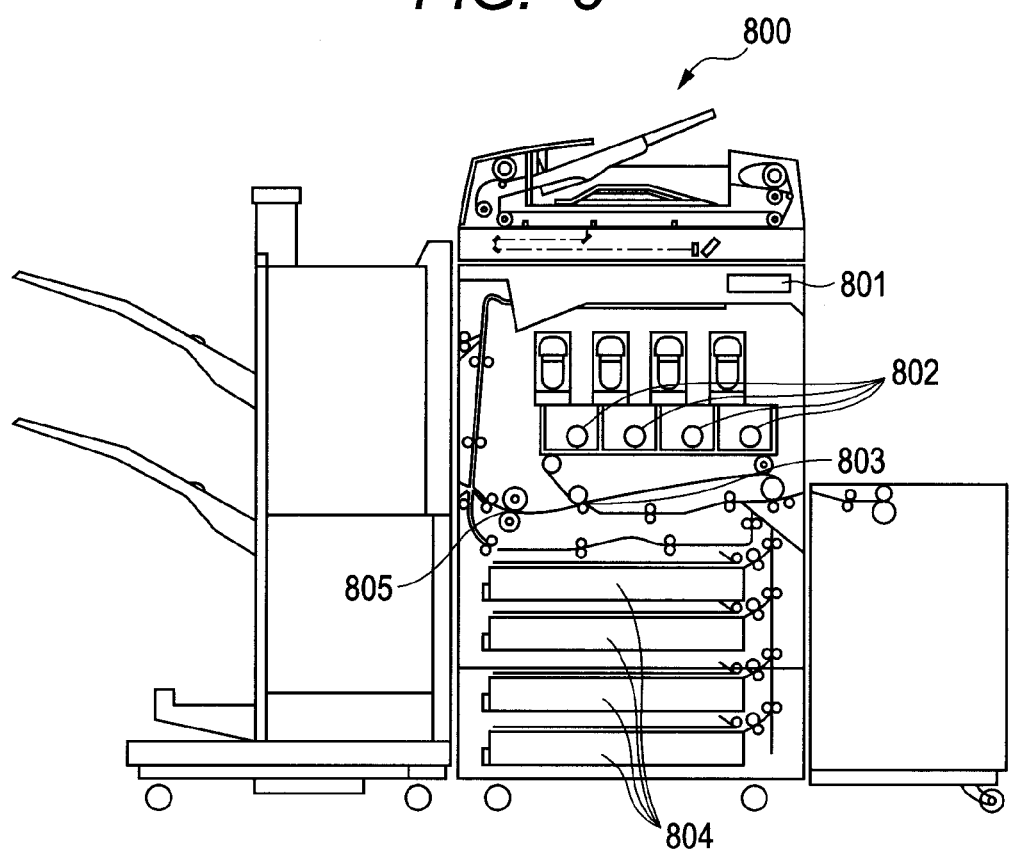
FIG. 8 is diagram schematically illustrating a hardware construction of an image reading unit 100 and an image output unit 103 of the image forming apparatus in FIG. 1.

FIG. 8 is a diagram schematically illustrating a hardware construction of the image reading unit 100, image receiving unit 101, and image output unit 103 of the image forming apparatus 800 such as a digital multifunction apparatus in FIG. 1 and illustrates a cross sectional view of the image forming apparatus 800. Although a control unit 801 includes the image processing unit 102 in FIG. 1, it has a function for controlling the whole image forming apparatus 800 besides the unit 102. The image forming apparatus 800 has functions of copy/printer/FAX. The image forming apparatus 800 has a structure adapted to form an image by overlaying colors of at least two colors (in the diagram, four colors). For this purpose, the image forming apparatus 800 has an image forming unit 802 of each color component. The image forming unit 802 forms a toner image developed by a coloring material such as toner or the like every color component of the image data. A formed toner image of each color component is overlaid onto an intermediate transfer belt 803. Therefore, an image (that is, color) of each color component is overlaid on the intermediate transfer belt 803, so that a full color image is obtained. There is also a case where the number of colors of the color components which are formed by the image forming units 802 is equal to 2 or 3 and it can be set to 5 or more colors. The color image data formed as mentioned above is transferred onto a paper sheet fed out of a tray 804, heated and fixed onto the sheet by a fixing device 805, and the sheet is ejected onto a discharge tray.

<Resolution Converting Process>

Figure 3A:
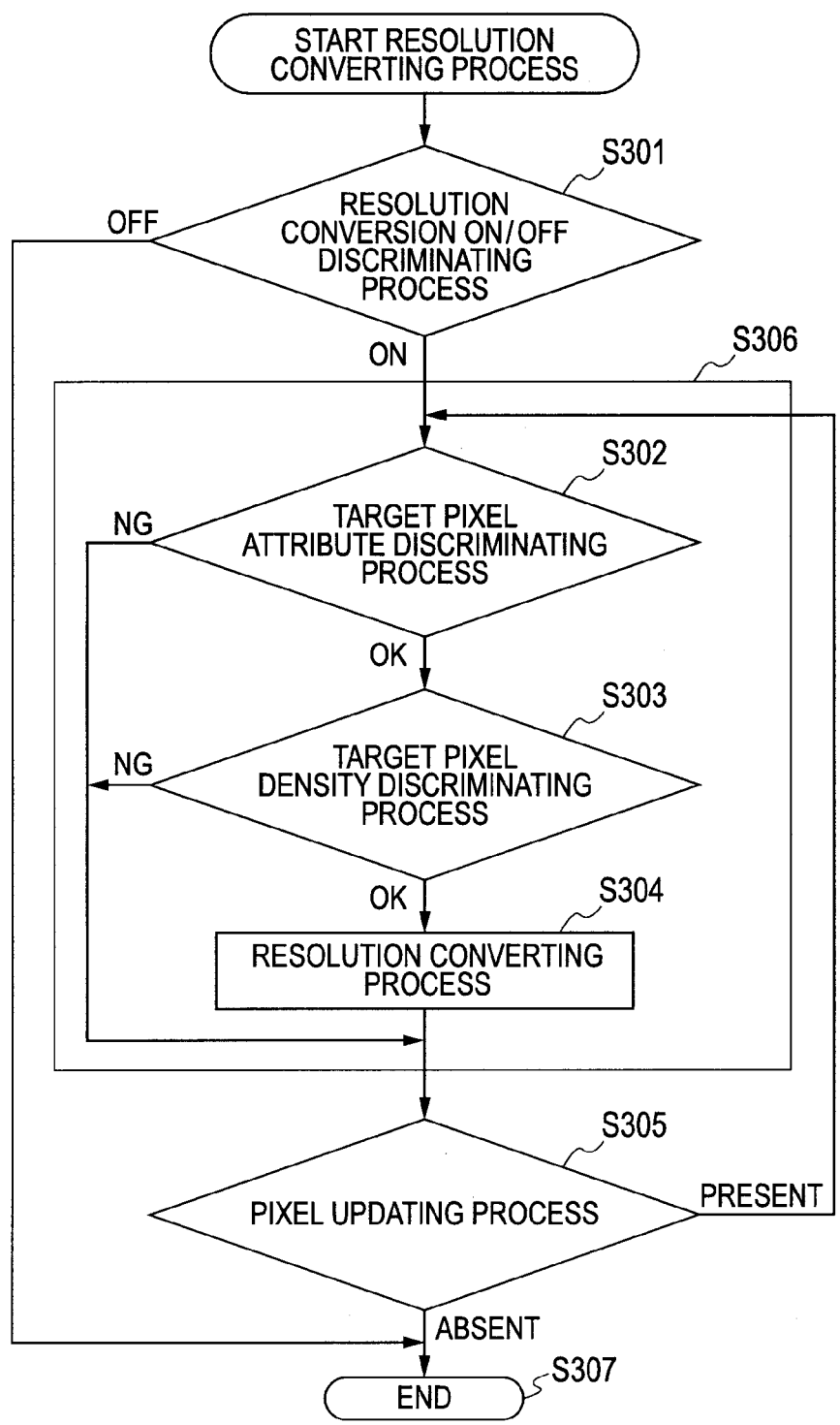
FIGS. 3A and 3B are flowcharts of a resolution conversion processing unit.

Details of the process by the resolution conversion processing unit 1022 are constructed by processing steps illustrated in FIG. 3A. Output image data is input from each of the scanner image processing unit 1020 and the printer image processing unit 1021. Whether or not the resolution conversion has been set to ON is discriminated in a resolution conversion ON/OFF discriminating process (S301). This setting is input by the UI unit 107 and stored in the resolution conversion setting storing unit 1052. If the setting of the resolution conversion is OFF as a result of the discrimination, the resolution converting process is finished (S307). On the other hand, if the setting of the resolution conversion is ON, the target pixels are sequentially changed every pixel and the following processes are executed. That is, first, the processing routine advances to a target pixel attribute discriminating process (S302). In the target pixel attribute discriminating process (S302), whether or not the attributes of the target pixel now serving as a processing target are the same as the attributes which had been set by the UI unit 107 and was stored in the resolution conversion setting storing unit 1052 is discriminated. If it is determined that those attributes coincide, the processing routine advances to a next target pixel density discriminating process (S303). In the target pixel density discriminating process (S303), whether or not the density of the target pixel lies within a range of the set density which had been set by the UI unit 107 and was stored in the resolution conversion setting storing unit 1052 is discriminated. In the case of the CMYK data, although the set density conforms with its set value, in the case of the RGB data, an inverted value is set. If it lies within the range of the set density, the processing routine advances to a resolution converting process (S304) and the resolution conversion according to the attribute is performed. A resolution converting method according to the attribute of the target pixel is set by the UI unit 107. That is, if all executing conditions of the resolution converting process are satisfied, the resolution converting process is executed for the first time.

Figure 3B:
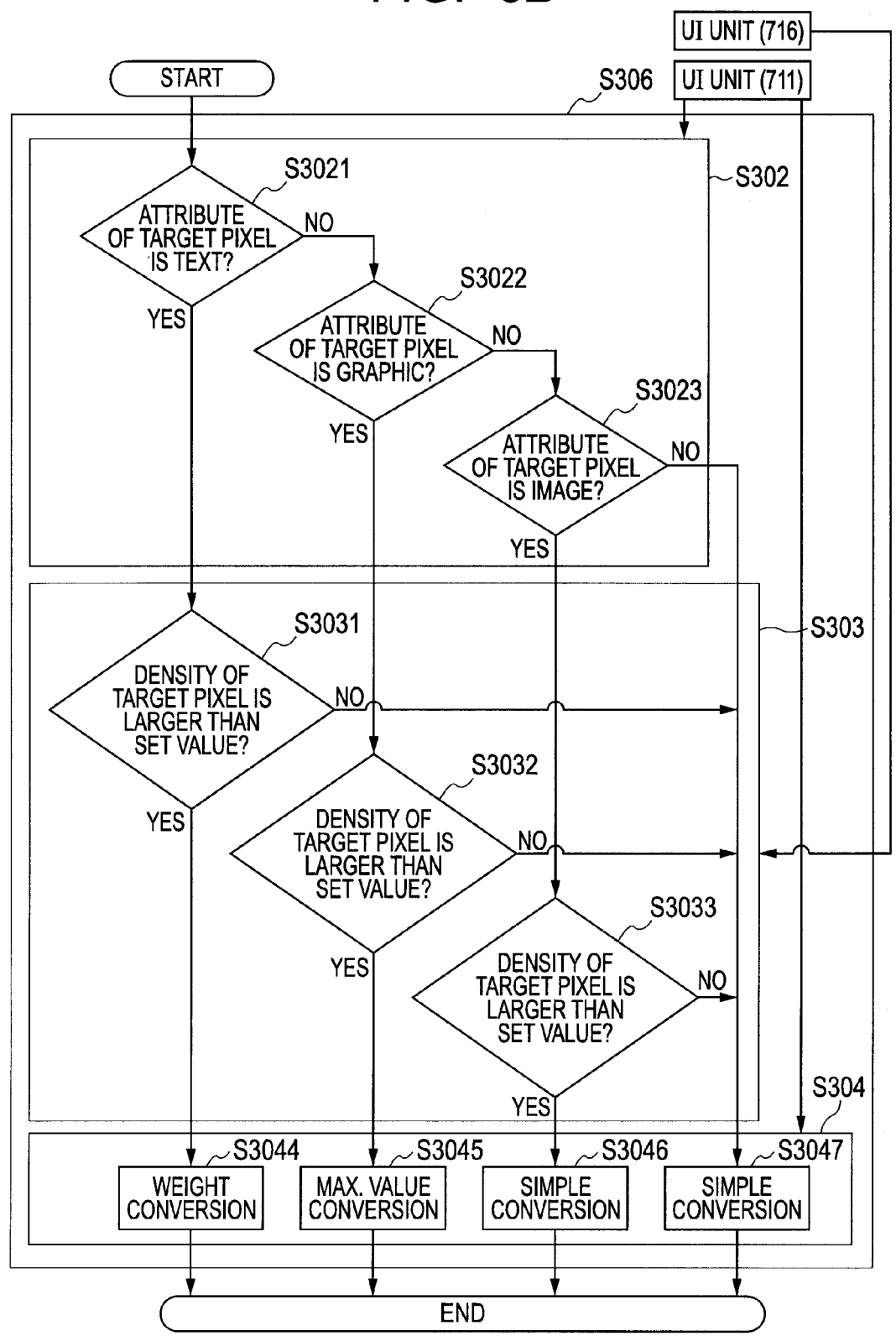

A series of processes (S306) from the target pixel attribute discriminating process (S302) to the resolution converting process (S304) is illustrated in FIG. 3B.

First, the attribute is discriminated by the target pixel attribute discriminating process (S302) constructed by (S3021) to (S3023). Subsequently, density discriminating processes (S3031) to (S3033) are executed based on the settings in the UI unit (716 in FIG. 7B). Converting processes (S3044) to (S3047) are executed based on the attributes of the target pixel according to the settings in the UI unit (711 in FIG. 7B).

After the resolution converting process (S304), the processing routine advances to a pixel updating process (S305). After that, if the next pixel exists in the pixel updating process (S305), the next pixel is set to the target pixel and the processing routine advances to the target pixel attribute discriminating process (S302). If the next pixel does not exist, the processing routine is finished.

The next pixel here denotes a pixel skipped in the main scan direction by one pixel on the image of 1200 dpi in the case of executing the resolution converting process for converting the image of 1200 dpi into the image of 600 dpi and also denotes a pixel skipped in the sub-scan direction by one pixel.

After completion of the process in the resolution conversion processing unit 1022, a color converting process is executed in 1023 and the processing routine advances to the trapping processing unit.

<Trapping Process>

Figure 2:
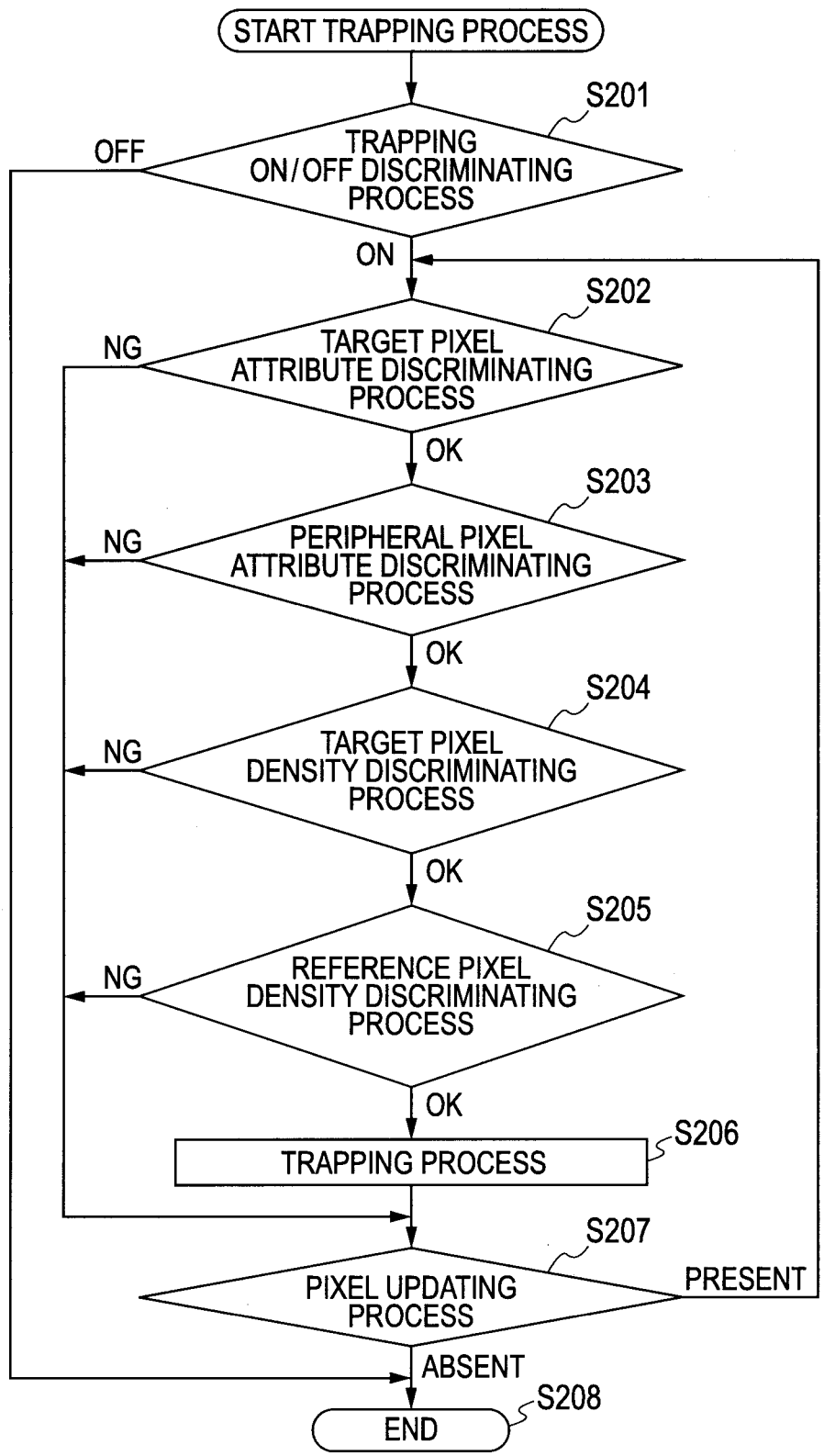
FIG. 2 is flowchart of a trapping processing unit.

Subsequently, processing steps of the trapping processing unit 1024 in FIG. 1 will be described. Details of the processes by the trapping processing unit 1024 in FIG. 1 are processing steps illustrated in FIG. 2. For the image data input from the color processing unit 1023, whether or not the trapping has been set to ON is discriminated in a trapping ON/OFF discriminating process (S201). This setting is input in the UI unit 107 and stored in the trapping setting storing unit 1051. As a result of the discrimination in s201, if the trapping setting is OFF, the trapping process is finished (S208). On the other hand, if the trapping setting is ON, attention is sequentially paid to the pixels every pixel and the following processes are executed. That is, first, the processing routine advances to a target pixel attribute discriminating process (S202). In the target pixel attribute discriminating process (S202), whether or not the attributes of the target pixel now serving as a processing target are the attributes which had been set by the UI unit 107 and stored in the trapping setting storing unit 1051 is discriminated. The attributes of the target pixel are obtained with reference to the attribute values associated with the pixel based on the attribute map. The attributes can be also expressed by the kind of object. If it is determined that those attributes are the same, the processing routine advances to a next peripheral pixel attribute discriminating process (S203). The trapping process here is a process for copying a peripheral pixel belonging to the object adjacent to the object to which the target pixel belongs to the position of the target pixel. In the present procedure, since the peripheral pixel becomes a pixel which is referred to in order to process the target pixel, it is also called a reference pixel.

In the peripheral pixel attribute discriminating process (S203), the peripheral pixel of the target pixel is set by the UI unit 107 in FIGS. 6A and 6B and whether or not it has the same attributes as the attributes stored in the trapping setting storing unit 1051 is discriminated. If it is determined that those attributes are the same, the processing routine advances to a next target pixel density discriminating process (S204). In the target pixel density discriminating process (S204), density of the target pixel is set by the UI unit 107 and whether or not it lies within the range of the set density stored in the trapping setting storing unit 1051 is discriminated. If it lies within the range of the set density, the processing routine advances to a next reference pixel density discriminating process (S205). In the reference pixel density discriminating process (S205), density of the reference pixel is set by the UI unit 107 and whether or not it lies within the range of the set density stored in the trapping setting storing unit 1051 is discriminated. If it lies within the range of the set density, the processing routine advances to a trapping process (S206) and the trapping is executed. That is, if the executing conditions of all trapping processes are satisfied, the trapping process is executed for the first time. If any one of the discriminating processes from the target pixel attribute discriminating process (S202) to the reference pixel density discriminating process (S205) does not satisfy any one of the executing conditions, the trapping process (S206) is not executed but the processing routine advances to a pixel updating process (S207). In the updating process (S207), if the next pixel exists, the next pixel is set to the target pixel and the processing routine advances to the target pixel attribute discriminating process (S202). If the next pixel does not exist, the processing routine is finished. The next pixel can be determined, for example, in raster order.

The processing steps from the resolution conversion processing unit 1022 to the trapping processing unit 1024 in FIG. 1 have been mentioned above.

<Setting of Resolution Converting Process>

Figure 7A:
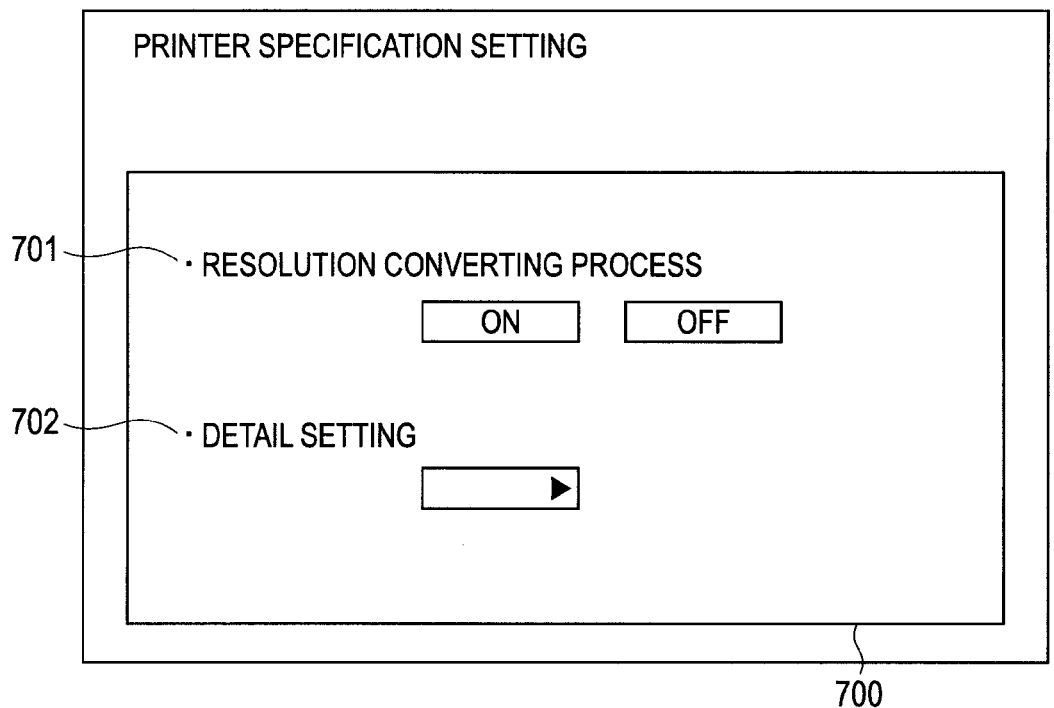
FIGS. 7A and 7B are diagrams illustrating UIs of the resolution conversion.

Subsequently, a fundamental setting of the resolution conversion will be described hereinbelow by using FIG. 7A. A selection is performed by the user. The resolution conversion ON or OFF is selected from a resolution conversion ON/OFF button 701. Further, when a detail setting button 702 is selected, a UI display screen of FIG. 7B appears and a detail setting is made from this display screen.

Subsequently, a detail setting of the resolution conversion will be described hereinbelow by using FIG. 7B. First, when the resolution conversion is performed, there is a button 711 for selecting a resolution converting method every attribute. The resolution converting method can be selected according to a text, a graphic, an image, others, or an object kind as an attribute. As a converting method of the resolution, a weight 712, an average 713, a maximum 714, and a simple 715 are now set as an example. The "weight" is a process for performing a weight averaging based on a predetermined weight to the target pixel and the peripheral pixels. A result of the weight averaging becomes a resolution conversion result to the areas of the target pixel and the peripheral pixels. The "average" is a process for calculating an average value of the target pixel and the peripheral pixels. A result of the averaging becomes a resolution conversion result to the areas of the target pixel and the peripheral pixels. The "maximum" outputs a maximum value among the target pixel and the peripheral pixels and the maximum value becomes a resolution conversion result to the areas of the target pixel and the peripheral pixels. The "simple" outputs the target pixel as a representative value of the target pixel and the peripheral pixels. The representative value becomes a resolution conversion result to the areas of the target pixel and the peripheral pixels. For example, in the "maximum", one pixel of the maximum density among 3×3 or 2×2 pixels is selected. In the "simple", one pixel at the predetermined pixel position (for example, target pixel) among the 3×3 or 2×2 pixels is selected. (The target pixel is one of the 3×3 or 2×2 pixels) By the above construction, the low resolution can be realized by the resolution converting process.

Subsequently, the density adapted to perform the resolution conversion is selected by a density selecting button 716, so that the density adapted to perform the resolution conversion is decided. The objects whose density lies within a range from 30 to 100 are used here as targets of the resolution converting process. The resolution conversion is simply performed to the density within a range from 0 to 29 which are not selected here.

Although the density selection has been set irrespective of the attribute in the above example, it is also possible to use a construction in which the density is designated every attribute. Reference numerals 0 to 100 indicate construction levels in the case where a result obtained by converting the image data (for example, RGB signal) as a processing target by using a conversion expression into a predetermined density signal has been allocated to 100 stages.

<Setting of Trapping Process>

Subsequently, a setting method of the fundamental setting and the detail setting of the functions of the trapping and the resolution conversion in the UI unit 107 will be described. First, the fundamental setting of the trapping will be described by using FIG. 6A.

First, when an instruction to set the trapping process is input by the user, a user interface 600 of FIG. 6A is displayed. The trapping ON or OFF is selected by the user from a trapping ON/OFF button 601 on the user interface 600. A width adapted to perform the trapping is also selected by the user from a trapping width selecting button 602. Density of the pixel which is got into the adjacent object (the pixel whose area has been expanded) is selected from a trapping density button 603. Further, when a detail setting button 604 is selected by the user, a UI display screen of FIG. 6B is displayed and a detail setting is made from this display screen.

Subsequently, the detail setting of the trapping will be described by using FIG. 6B. A selection of the button is performed by the user in the following description. First, the attribute which the user wants to perform the trapping is selected by selecting buttons 611 and 612 with respect to each of the target pixel and the reference pixel. As an attribute, it is selected from object kinds such as text, graphic, image, and the like. The object which can be selected is a kind which is distinguished by the printer image processing unit by a command of the PDL image data or a kind which is distinguished by the foregoing image area separating process that is executed by the image forming apparatus. Applying density of the trapping, that is, a range of the density of the target pixel which is subjected to the trapping is designated by a button 613. It is set here in such a manner that by selecting the minimum density and the maximum density, the trapping is applied to the density between them. Also with respect to the reference pixel, a range of the density is similarly set by a button 614.

Although the density selection has been set irrespective of the attribute in the above example, a construction in which the density is designated every attribute may be used.

The executing conditions adapted to execute the trapping process set by the user through the user interface as mentioned above are stored in the trapping setting storing unit 1051.

A processing procedure when the detail setting of the button 702 in FIG. 7A has been selected will now be described with reference to FIG. 4. First, a user interface display screen of FIG. 7B is displayed (S400). At this time, if some setting has already been made, the set value is read out of the resolution conversion setting storing unit 1052 and displayed. Subsequently, whether or not both of the functions of the trapping and the resolution conversion have simultaneously been selected is discriminated (S401). Although the discrimination is made with reference to the trapping setting storing unit 1051 and the resolution conversion setting storing unit 1052, if the decision value is not stored yet, the setting which has temporarily been stored is referred to. If such a setting as to execute both of them has been made, the set value of each item of the trapping detail setting, that is, the executing conditions are read out of the trapping setting storing unit (S402). For example, the range of the density of the target pixel to which the trapping is applied is read out. Subsequently, on the user interface display screen of FIG. 7B, in such a manner that the conditions overlapped with the executing conditions of the trapping which were read out in step S402 cannot be selected as executing conditions of the resolution conversion, the overlapped items and values are displayed again in a state where they cannot be selected. For example, they are displayed in gray. For example, in the case of restricting the attribute as an executing condition, an attribute 611 which has been set as an attribute which the user wants to perform the trapping is displayed on the user interface in such a manner that the weight 712 cannot be selected as an executing condition of the resolution conversion (S403). In such a restricted state, the setting of the resolution conversion by the user is received and the received set value is stored (S404).

In this manner, the conditions under which the weight converting process of the resolution conversion or the trapping is applied are restricted, upon setting the executing conditions, such that the conditions may not overlap with each other. Accordingly, it becomes possible to avoid such a situation that the weight converting process of the resolution conversion and the trapping are executed to the object (pixel) having the same attribute. That is, exclusive control can be made. Thus, the deterioration in picture quality which is caused by the execution of both of the processes and which has been described as a problem can be prevented.

Although the exclusive control has been made with respect to the attribute which selects the weight conversion of the resolution conversion in the foregoing example, the settings of the density of the target/reference pixels of the trapping may be restricted instead of the attribute.

Figure 7B:
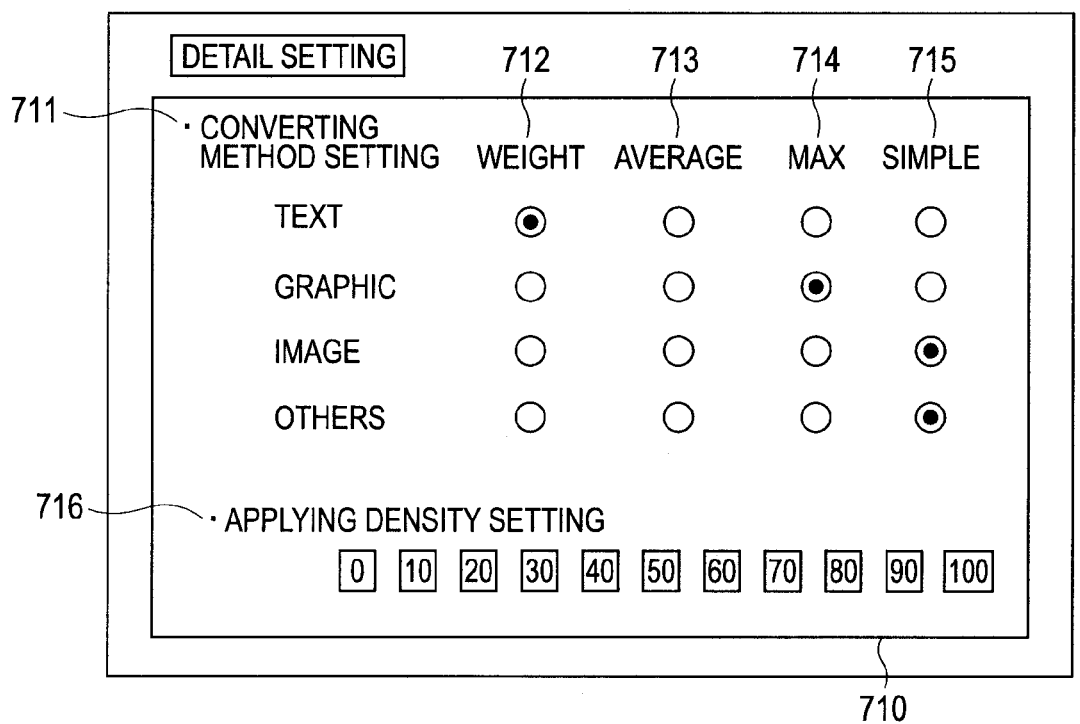

For example, if the weight conversion of the resolution conversion in at least one kind of object has been selected in the setting of the change setting method 711 on the display screen of FIG. 7B, the trapping applying density settings of the target/reference pixels on the display screen of FIG. 6B are displayed in gray on the user interface so that they cannot be set.

By constructing as mentioned above, the setting of a density threshold value of the trapping is disabled and such a mode that the trapping cannot be performed to all of the density can be set. By controlling the trapping by the threshold value as mentioned above, an image obstacle is eliminated.

The case where the executing conditions of the trapping process are set first and, thereafter, the executing conditions of the resolution converting process are set has been described in the above example. On the other hand, in the case where the setting of the resolution conversion has been made first, similarly, by constructing in such a manner that when the setting of the trapping process is made, the portions corresponding to the items and values selected as executing conditions of the resolution conversion are displayed in gray and cannot be selected as trapping targets, the object can be also accomplished.

Although the selection by the button has been performed in the above example, the numerical value may be directly input.

With the foregoing construction, by restricting such a situation that the trapping process and the resolution converting process are executed to the same pixel, the deterioration in picture quality can be suppressed.

Second Embodiment

Figure 5A:
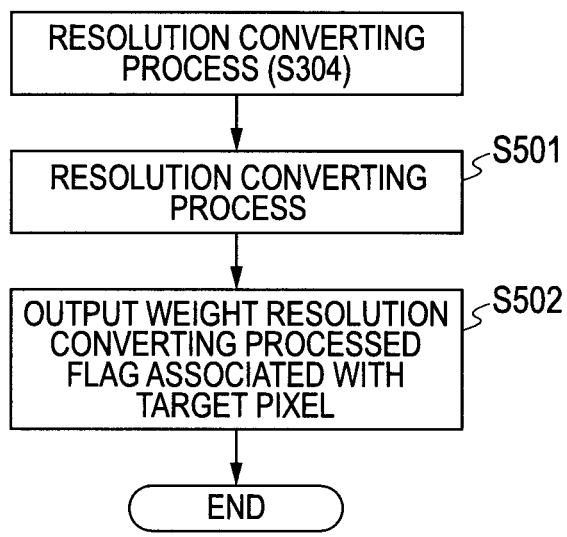
FIGS. 5A and 5B are flowcharts of a trapping process and a resolution converting process for realizing exclusive control of the trapping and the resolution conversion in the second embodiment.
Figure 5B:
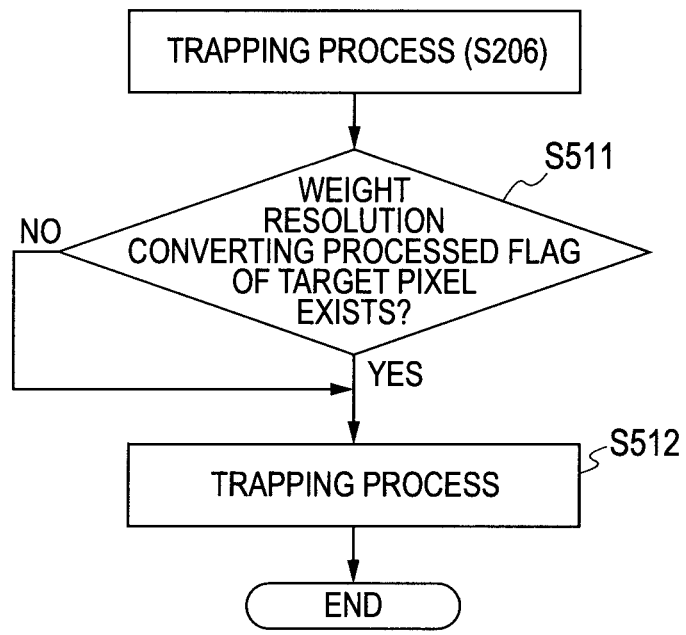

Subsequently, a second embodiment will be described with respect to a system in which even in the case where the user does not make the exclusive control by using the detail setting, the exclusive control of the trapping process and the resolution converting process is automatically made. The construction and operation of the first embodiment other than the procedure described in FIG. 4 are also common to those in the second embodiment. The second embodiment differs from the first embodiment with respect to the operations by the trapping processing unit and the resolution conversion processing unit and its procedure is illustrated in FIGS. 5A and 5B.

The resolution converting process will be described with reference to FIG. 5A. This procedure shows details in the embodiment of step S304 in FIG. 3A. First, the resolution conversion processing unit is executed with respect to the target pixel in a manner similar to the first embodiment (S501). After that, a weight or average resolution converted flag is formed as a foregoing attribute map in association with the target pixel to which the resolution conversion processing unit has been executed and is sent to the trapping processing unit (S502). Naturally, such a flag is not directly sent but may be temporarily stored into a memory or the like.

The trapping will be described with reference to FIG. 5B. This procedure shows details in the embodiment of step S206 in FIG. 2. The weight resolution converted flag associated with the portion to which the resolution converting process has been executed, for example, with the pixel or area is referred to (S511). If the flag has been set, the trapping process is not executed, but if the flag is not set, the trapping process is executed (S512).

By the above construction, such a situation that the trapping process and the weight resolution converting/average resolution converting process are executed to the same pixel can be restricted and the occurrence of the deterioration in picture quality can be prevented.

Third Embodiment

Subsequently, in the third embodiment, an example in which when the trapping and the weight resolution converting process are selected by the user, the weight resolution conversion is executed or the converting mode is switched to the maximum resolution conversion or the simple resolution conversion according to the density of the reference pixel will be described by using FIG. 10.

At the time of the resolution process, whether or not the attribute of the target pixel is the same as the attribute adapted to perform the weight resolution conversion is discriminated by the user from 712 in FIG. 7B (S1001). If YES here, whether or not the target pixel which is set from 613 in FIG. 6B has the density adapted to perform the trapping is discriminated (S1002). If YES here, whether or not the reference pixel which is set from 614 has the density adapted to perform the trapping is discriminated (S1003). If NO here, the weight conversion is executed (S1004).

In the processing routine other than the foregoing flow, the simple or maximum conversion is executed (S1005).

Subsequently, for example, a case where the weight resolution conversion has been set to the text as a setting of the converting method of the resolution converting process on the user interface display screen of FIG. 7B will be described with reference to FIG. 9 as an example.

Figure 9:
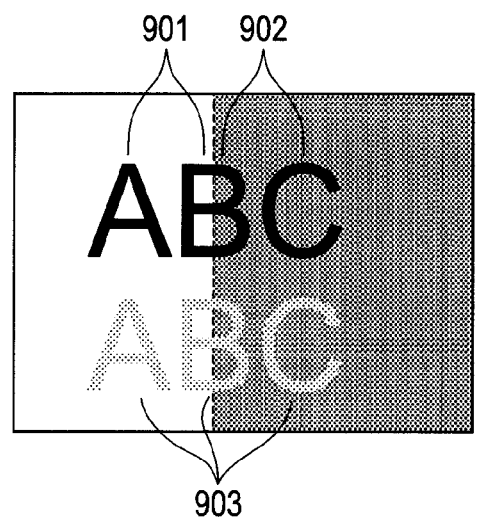
FIG. 9 is diagram illustrating an example of portions where an effect is derived in the invention.
Figure 10:
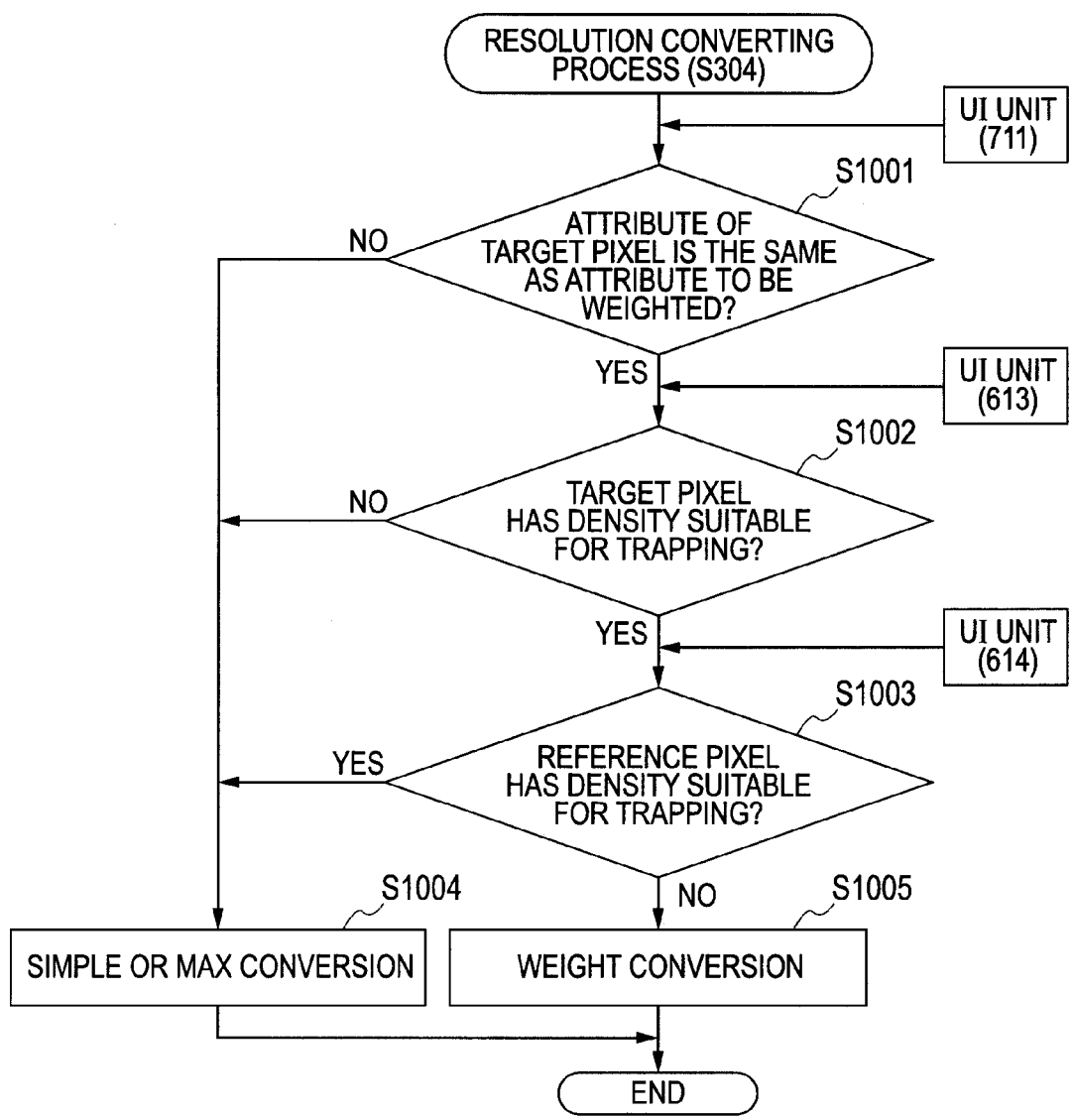
FIG. 10 is flowchart in the case where a weighting process and an averaging process are not executed to a portion where the trapping process is executed.

At this time, in a character object "A" of the image data in FIG. 9, since the attribute of the target pixel is the same as the attribute adapted to perform the weight resolution conversion in (S1001) in FIG. 10, (S1002) follows. On the user interface display screen of FIG. 6B, the density of the target pixel is set to 60 to 100% in the trapping applying density. When the density of the target pixel in the image data is equal to 100%, since the density of the target pixel becomes the density adapted to perform the trapping, (S1003) follows. On the other hand, when the reference pixel has been set to 20 to 100% in FIG. 6B, if the reference pixel of the image data is equal to 0%, the trapping is not performed. Therefore, the answer in S1003 is NO, (S1005) follows, and the weight (resolution) conversion is executed.

Thus, in portions 901 which show character objects of thick density and in which a background is thin in FIG. 9, the weight resolution converting process is executed and the trapping process is not executed. On the other hand, in portions 902 which show character objects of thick density and in which a background is thick, the trapping process is executed. The resolution conversion of "simple" or "maximum" is executed here. Further, when target pixels are thin as shown at 903, the resolution conversion of "simple" or "maximum" is executed and the trapping process is not performed.

By the above construction, the trapping is certainly applied to the portion where the trapping is necessary. On the other hand, in the portion where there is no need to perform the trapping, in the case where the user wants to improve the quality of the characters themselves according to the settings, the weight resolution converting process can be executed.

Although the resolution converting process has a priority to the trapping process in the above first and second embodiments, the trapping process may be preferentially executed. In such a case, in the first embodiment, if the conditions adapted to execute the trapping process have already been set, the same conditions as those conditions cannot be set as conditions adapted to perform the resolution converting process. Therefore, for example, the relevant conditions are displayed in gray on the UI. In the second embodiment, the order of the resolution converting process and the trapping process is reversed, the trapping process is executed first, and a flag associated with the processed pixel is formed. At the time of the resolution converting process, if such a flag has been set with reference to it, even in the case where the conditions coincide with them, the resolution converting process is skipped. The exclusive control can be also realized as mentioned above. The first and second embodiments may be combined. In the foregoing embodiment, since the resolution converting process is executed before the dither and the trapping process is executed after the dither, the trapping has a priority. However, if the resolution converting process is executed to the image data after the dither process, the trapping process can be also preferentially executed as mentioned above.

Although the image forming apparatus of FIG. 8 is what is called a tandem type, the invention can be also applied to an image forming apparatus of a single drum type in which the image forming units are sequentially come into contact with an intermediate transfer body and a toner image of each color component is transferred and overlaid. The invention is not limited to the electrophotographic type but can be also applied to an image forming apparatus of another type.

Although the executing conditions of the trapping process or the resolution converting process have been discriminated on a pixel unit basis in the above example, they may be discriminated on a unit basis of the area of a predetermined size. In such a case, the executing conditions are set in association with the area and a flag showing the completion of execution of the trapping process or the like is set.

Further, although the resolution converting process has been executed so far, for example, an anti-aliasing process or a sharpness process in which in the case where an input and an output of the resolution processing unit have the same resolution and the weight or average process is executed only to edge portions of characters or the like, thereby reducing shagginess of the characters can be executed. Also in this case, although a similar image obstacle occurs when performing the trapping, it can be also solved in a manner similar to that mentioned in the above example.

Other Embodiments

Although the embodiments have been described in detail above, for example, the invention can be applied to an embodiment such as system, apparatus, method, program, or computer-readable storage medium (recording medium). Specifically speaking, the invention may be applied to a system constructed by a plurality of apparatuses or to an apparatus constructed by one device.

The invention is also accomplished by a construction in which a program of software for realizing the functions of the embodiments mentioned above (in the embodiments, program corresponding to the flowcharts illustrated in the diagrams) is supplied to a system or an apparatus and a computer executes the supplied program. Therefore, program codes themselves which are installed into the computer in order to realize the functions and processes of the invention by the computer also realize the invention. In such a case, the invention can be applied to any form such as object code, program which is executed by an interpreter, script data which is supplied to the OS, or the like so long as it has functions of the program. The program is supplied to the computer through a recording medium or a communication medium.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-146928, filed Jun. 19, 2009, which is hereby incorporated by reference herein in its entirety.

The invention claimed is:

1. An image forming apparatus comprising:
a trapping processing unit configured to perform a trapping process to expand an outline of an object whose boundary is in contact with a boundary of an other object;
a resolution conversion processing unit configured to perform a resolution conversion process to change a density of an edge of the object; and
a restricting unit configured to restrict processing so that the trapping process by the trapping processing unit and the resolution conversion process by the resolution conversion processing unit are not executed to a same pixel of the object,
wherein the trapping processing unit comprises a discriminating unit configured to discriminate whether or not the trapping process is performed on a target pixel of the other object according to (a) a density of the target pixel and (b) a density of a reference pixel of the object whose boundary is in contact with the boundary of the other object.

2. An image forming apparatus comprising:
a trapping processing unit configured to perform a trapping process to expand an outline of an object whose boundary is in contact with a boundary of an other object;
a resolution conversion processing unit configured to perform a resolution conversion process to change a density of an edge of the object; and
a restricting unit configured to restrict processing so that the trapping process by the trapping processing unit and the resolution conversion process by the resolution conversion processing unit are not executed to a same pixel of the object,
wherein the trapping processing unit comprises a discriminating unit configured to discriminate whether or not the trapping process is performed to a target pixel of the other object according to (a) attribute information of the target pixel and (b) attribute information of a reference pixel of the object whose boundary is in contact with the boundary of the other object.

3. An image forming apparatus according to claim 1, wherein the resolution conversion process performed by the resolution conversion processing unit includes a weight resolution conversion for weighting or averaging peripheral pixels of the target pixel, a maximum resolution conversion for selecting maximum density among the peripheral pixels, and a simple resolution conversion for selecting the target pixel when resolution is converted.

4. An image forming apparatus according to claim 1, wherein the resolution conversion processing unit selects a condition adapted to apply the resolution conversion according to attribute information of the target pixel.

5. An image forming apparatus according to claim 2, wherein the restricting unit performs the restriction by using the discriminating unit and the resolution conversion processing unit.

6. An image forming apparatus according to claim 1, wherein the restricting unit is realized by constructing so that the trapping process by the trapping processing unit or the resolution conversion process by the resolution conversion processing unit is not set by a UI.

7. An image forming apparatus according to claim 6, wherein in the UI, when a weight or an average has been selected by a resolution converting method, the restriction is performed by displaying trapping applying density in gray so that it cannot be selected.

8. An image forming apparatus according to claim 2, wherein the attribute information is a character attribute, a graphic attribute, an image attribute, a thin line attribute, or a color attribute.

9. An image forming apparatus according to claim 1, wherein the restricting unit comprises a unit configured to form a flag of a portion where a weighting process or an averaging process has been executed in the resolution converting process, and when the trapping process is executed, by executing the trapping by using the flag to portions other than the portion where the weighting process or the averaging process has been executed, the restriction is performed.

10. An image forming method comprising:
performing a trapping process to expand an outline of an object whose boundary is in contact with an outline of an other object;
performing a resolution conversion process to change a density of an edge of an object; and
restricting processing so that the trapping process and the resolution conversion process are not executed to a same pixel of an object,
wherein the trapping process comprises discriminating whether or not the trapping process is performed on a target pixel of the other object according to (a) a density of the target pixel and (b) a density of a reference pixel of the object whose boundary is in contact with the boundary of the other object.

11. An image forming method comprising the steps of:
performing a trapping process to expand an outline of an object whose boundary is in contact with a boundary of an other object;
performing a resolution conversion process to change a density of an edge of the object; and
restricting processing so that the trapping process and the resolution conversion process are not executed to a same pixel of the object,
wherein the trapping process comprises discriminating whether or not the trapping process is performed on a target pixel of the other object according to (a) attribute information of the target pixel and (b) attribute information of a reference pixel of the object whose boundary is in contact with the boundary of the other object.

12. An image processing apparatus comprising:
an input unit configured to input an image;
a conversion unit configured to perform a resolution conversion process to lower a density of an edge included in the image;
a trapping processing unit configured to perform a trapping process on the image; and
a control unit configured to control processing such that in a case where the conversion unit performs the resolution conversion process to the image input by the input unit, the trapping processing unit does not perform the trapping process to the image after the resolution conversion process, and such that in a case where the conversion unit does not perform the resolution conversion process to the image input by the input unit, the trapping processing unit performs the trapping process to the image without the resolution conversion process.

13. An image processing apparatus according to claim 12, wherein the conversion unit performs the resolution conversion process to a bitmap image having a predetermined resolution.

14. An image processing apparatus according to claim 13, wherein the conversion unit performs the resolution conversion process so as to make the density of the edge included in the image after the resolution conversion process uneven.

15. An image processing apparatus according to claim 13, wherein the conversion unit performs the resolution conversion process such that a density of a pixel included in the image after the resolution conversion process corresponds to a weighted average of a plurality of pixels included in the image.

16. An image processing apparatus according to claim 13, wherein the trapping processing unit performs the trapping process such that in a case where a pixel included in the image has a density equal to or larger than a predetermined level, it is determined that the density is to be changed, and in a case where the pixel has a density smaller than the predetermined level, it is determined that the density is not to be changed.

17. An image processing apparatus according to claim 16, wherein in a case where it is determined that the density of the pixel is to be changed, the trapping processing unit changes the density of the pixel based on a density of a pixel adjacent to the pixel.

18. An image processing apparatus according to claim 13, further comprising a reception unit configured to receive, via a user interface that displays a first screen for a user to select execution or non-execution of the resolution conversion process by the conversion unit and a second screen for the user to select execution or non-execution of the trapping process by the trapping processing unit, information on the execution or non-execution of the resolution conversion process and the execution or non-execution of the trapping process, wherein the control unit controls the processing based on the information received by the reception unit, and wherein in a case where the execution of the resolution conversion process is selected by the user on the first screen of the user interface, the second screen of the user interface is displayed such that the execution of the trapping process cannot be selected by the user and such that the non-execution of the trapping process is selected.

19. An image processing method comprising:
inputting an image by an input unit;
performing a resolution conversion process to lower a density of an edge included in the image;
performing a trapping process on the image; and
controlling processing such that in a case where the resolution conversion process is performed on the image input by the input unit, the trapping processing is not performed on the image after the resolution conversion process, and such that in a case where the resolution conversion process is not performed on the image input by the input unit, the trapping process is performed on the image without the resolution conversion process.

20. An image processing method according to claim 19, wherein the resolution conversion process is performed on a bitmap image having a predetermined resolution.

21. An image processing method according to claim 20, wherein the resolution conversion process is performed so as to make the density of the edge included in the image after the resolution conversion process uneven.

22. An image processing method according to claim 20, wherein the resolution conversion process is performed such that a density of a pixel included in the image after the resolution conversion process corresponds to a weighted average of a plurality of pixels included in the image.

23. An image processing method according to claim 20, wherein the trapping process is performed such that in a case where a pixel included in the image has a density equal to or larger than a predetermined level, it is determined that the density is to be changed, and in a case where the pixel has a density smaller than the predetermined level, it is determined that the density is not to be changed.

24. An image processing method according to claim 23, wherein in a case where it is determined that the density of the pixel is to be changed, the trapping processing changes the density of the pixel based on a density of a pixel adjacent to the pixel.

25. An image processing method according to claim 20, further comprising receiving, via a user interface that displays a first screen for a user to select execution or non-execution of the resolution conversion process and a second screen for the user to select execution or non-execution of the trapping process, information on the execution or non-execution of the resolution conversion process and the execution or non-execution of the trapping process, controlling the processing based on the received information, and wherein in a case where the execution of the resolution conversion process is selected by the user on the first screen of the user interface, the second screen of the user interface is displayed such that the execution of the trapping process cannot be selected by the user and such that the non-execution of the trapping process is selected.

26. A non-transitory computer readable storage medium storing a computer executable code that, when executed, causes a computer to perform the method of claim 19.

* * * * *